(12) United States Patent
Blakely et al.

(10) Patent No.: US 12,253,193 B1
(45) Date of Patent: Mar. 18, 2025

(54) DRAIN ADAPTER

(71) Applicants: Brandon Blakely, Burlington, NC (US); Niko Jovicevic, Statesville, NC (US)

(72) Inventors: Brandon Blakely, Burlington, NC (US); Niko Jovicevic, Statesville, NC (US)

(73) Assignee: CAMCO Manufacturing, LLC, Greensboro, NC (US)

( * ) Notice: Subject to any disclaimer, the term of this patent is extended or adjusted under 35 U.S.C. 154(b) by 102 days.

(21) Appl. No.: 18/050,695

(22) Filed: Oct. 28, 2022

(51) Int. Cl.
*F16L 21/00* (2006.01)
*B60R 15/04* (2006.01)
*F16L 15/00* (2006.01)

(52) U.S. Cl.
CPC ............ *F16L 21/002* (2013.01); *B60R 15/04* (2013.01); *F16L 15/006* (2013.01)

(58) Field of Classification Search
CPC ....... F16L 21/002; F16L 47/26; F16L 47/265; F16L 25/14
See application file for complete search history.

(56) References Cited

U.S. PATENT DOCUMENTS

| | | | | |
|---|---|---|---|---|
| 3,655,132 A | * | 4/1972 | Rosic | F16L 25/14 239/206 |
| 3,904,120 A | * | 9/1975 | Sbicca | F16L 25/14 239/288.5 |
| 4,440,406 A | * | 4/1984 | Ericson | F16L 25/14 277/615 |
| 4,732,397 A | * | 3/1988 | Gavin | F16L 25/14 277/609 |
| 5,286,040 A | * | 2/1994 | Gavin | F16L 25/14 277/609 |
| 5,725,099 A | * | 3/1998 | Ericson | F16L 25/14 206/576 |
| 6,488,218 B1 | * | 12/2002 | Townsend | F16L 25/14 239/203 |
| 7,121,589 B2 | * | 10/2006 | Hawkinson | F16L 25/14 285/139.2 |

(Continued)

FOREIGN PATENT DOCUMENTS

| | | | | |
|---|---|---|---|---|
| CN | 105020526 A | * | 11/2015 | ............ F16L 25/14 |
| DE | 3338001 C2 | * | 4/1987 | ............ F16L 25/14 |

*Primary Examiner* — Matthew Troutman
*Assistant Examiner* — Fannie Kee
(74) *Attorney, Agent, or Firm* — Tuggle Duggins P.A.; Blake P. Hurt; Reinier R. Smit

(57) ABSTRACT

An adapter for facilitating an easy and secure connection between a sewage drainpipe and a sewage disposal inlet. The adapter includes a tubular member, at least one connection lug, a ring, and at least one flange. The tubular member forms a channel defining an inlet and an outlet, the outlet insertable into the sewage disposal site inlet. At least one flange extends from an outer surface of the tubular member to increase an outer circumference of the tubular member to allow the adapter to facilitate a rapid and secure frictional connection with the sewage disposal site inlet. The flanges are configured to form a stepped configuration so the adapter may securely fit into a variety of disposal site inlet sizes. The ring, typically disposed above the flanges, includes a threaded portion, and is configured to thread onto a predetermined sewage disposal site inlet size to form a substantially leak-free seal.

18 Claims, 8 Drawing Sheets

(56) References Cited

U.S. PATENT DOCUMENTS

| | | | | |
|---|---|---|---|---|
| 7,717,360 | B1* | 5/2010 | Kander | F16L 25/14 |
| | | | | 239/285 |
| 8,459,698 | B2* | 6/2013 | Magargal | F16L 47/26 |
| | | | | 239/200 |
| 8,684,322 | B2* | 4/2014 | Park | F16L 25/14 |
| | | | | 248/245 |
| 10,081,937 | B2* | 9/2018 | Elliott | F16L 25/14 |
| 2005/0284956 | A1* | 12/2005 | Mast | F16L 25/14 |
| | | | | 239/203 |
| 2008/0079258 | A1* | 4/2008 | Siegel | F16L 25/14 |
| | | | | 285/5 |
| 2009/0250922 | A1* | 10/2009 | Rossman | F16L 25/14 |
| | | | | 239/289 |
| 2013/0049352 | A1* | 2/2013 | Guo | F16L 25/14 |
| | | | | 285/119 |
| 2014/0290028 | A1* | 10/2014 | Ishaya | F16L 25/14 |
| | | | | 29/428 |
| 2019/0331277 | A1* | 10/2019 | Vachon | F16L 25/14 |
| 2019/0390805 | A1* | 12/2019 | Kennedy | F16L 25/14 |
| 2020/0132230 | A1* | 4/2020 | Shaw | F16L 25/14 |
| 2020/0296883 | A1* | 9/2020 | Thompson | F16L 25/14 |
| 2021/0285684 | A1* | 9/2021 | Beach | F16L 25/14 |
| 2021/0301955 | A1* | 9/2021 | Tang | F16L 25/14 |

* cited by examiner

DRAIN ADAPTER

FIELD OF THE INVENTION

The disclosure herein pertains to sewage pipe adapters generally, and specifically to a drain adapter for connecting a sewage drainpipe, typically of a recreational vehicle, to a sewage disposal site inlet.

DESCRIPTION OF THE PRIOR ART AND OBJECTIVES OF THE INVENTION

Recreational vehicles are extremely popular and, as the term is generally understood and used herein, includes a wide range of motor vehicles and trailers that include living accommodations. The term recreational vehicle ("RV") includes motorhomes, campervans, travel trailers, pop-up campers and other vehicles that are either self-propelled or which can be towed behind another vehicle, typically a car or truck. These RVs are primarily used for vacations, camping trips, sports outings, or other circumstances where temporary living accommodations are preferred or even required. It should be noted that the accessories typically used in the RV market are often used in other areas as well, for example in the boating or camping community.

Many of these RVs are very well-appointed and may include living space, bedroom space, as well as kitchen and bathroom facilities. Some even come equipped with laundry facilities. Larger RVs may contain an on-board water storage and/or a connection to facilitate use of a water supply at a campsite, RV park, or the like. All RVs that have a sink, shower and/or toilet need to have at least one storage tank to collect and hold the wastewater. Separate tanks are often used for "grey water" (collected from sinks and showers) and "black water" (collected from the toilet). Wastewater in the tank is then periodically emptied into a dump station provided at the campground, RV park, or other location. Emptying the wastewater from the storage tank typically involves connecting a flexible hose at one end to the tank and at the other end to the inlet for the dump station, or to a portable holding tank that is then used to transport the waste to the dumping station.

Although the size may vary depending on the make and model of the RV, the most common wastewater tank outlets are three inches in diameter. The size of the sewage disposal site inlets, however, may range from three inches in diameter all the way to six inches in diameter. For this reason, many RV enthusiasts need adapters to create a tight, frictional (i.e., interference) or a threaded connection between a sewage disposal hose and the sewage disposal site inlet. The adapters are designed to couple the common three-inch diameter outlet from the waste hose to an otherwise incompatible sewage disposal site inlet, such as a four-inch diameter sewage disposal site inlet. These adapters facilitate a tight, frictional (i.e., interference) or a threaded connection between the RV sewage hose and the sewage disposal site inlet.

A tight, frictional (i.e., interference) or a threaded connection may establish a substantially leak-free fit between an adapter and a sewage disposal site inlet. A tight interference fit is typically easier and quicker to establish, compared to a threaded fit, making it desirable for connections used for sewage drainpipes since most consumers would prefer to spend as little time setting up the sewage drainpipe as is necessary due to the undesirable conditions (unsanitary waste, noxious fumes, etc.). A threaded fit typically requires more user interaction (i.e., threading the adapter to the inlet), however, it is more likely to form a substantially leak-free connection with the sewage disposal site inlet because the contents disposed through the sewage drainpipe are unlikely to spill out, whether it be unsanitary waste, noxious fumes, and/or drainpipe cleaning chemicals.

Thus, in view of the problems and disadvantages associated with prior art devices, the present disclosure was conceived and one of its objectives is to provide an adapter for coupling a sewage drainpipe to a sewage disposal site inlet.

It is another objective of the present disclosure to provide an adapter for coupling a sewage drainpipe to an otherwise incompatible sewage disposal site inlet, to create a tight, frictional (i.e., interference) fit for rapid connection and a threaded connection for a substantially leak-free seal.

It is yet another objective of the present disclosure to provide an adapter for a sewage disposal site inlet that is easily manufactured with a minimal amount of material resulting in a lighter weight adapter.

It is still a further objective of the present disclosure to provide an adapter that facilitates the connection of a recreational vehicle sewage drainpipe to a 3½" sewer pipe inlet, a 4" sewer pipe inlet, and a 4½" sewer pipe inlet.

It is yet a further objective of the present disclosure to provide an adapter including at least one lug connection to facilitate connection with a sewage drainpipe including a bayonet fitting.

It is another objective of the present disclosure to provide an adapter that enables a sewage drainpipe to couple to a sewage disposal site inlet quickly and easily without need for any clamps or additional tools.

Various other objectives and advantages of the present disclosure will become apparent to those skilled in the art as a more detailed description is set forth below.

SUMMARY OF THE INVENTION

The aforesaid and other objectives are realized by providing an adapter for coupling a sewage drainpipe of a recreational vehicle to a sewage disposal site inlet. The adapter includes a tubular member defining an inlet, an outlet, an outer surface, and an inner surface. At least one flange may extend from and be disposed on the outer surface of the tubular member to increase a circumference of the tubular member. The flange preferably defines a lower portion further defining a first extended dimension and an upper portion further defining a second extended dimension. The adapter may include a ring extending from and annularly disposed on the outer surface of the tubular member. A connection lug may extend from and be disposed on the outer surface to enable the sewage drainpipe to couple to the sewage disposal site inlet quickly and easily via a bayonet fitting.

In the preferred embodiment, the first extended dimension extends (i.e., increases) the outer circumference of the tubular member less than the second extended dimension. The first extended dimension facilitates a tight, frictional (i.e., interference) fit connection between the sewage drainpipe and a 3½" sewage disposal site inlet. The second extended dimension facilitates a tight, frictional (i.e., interference) fit connection between the sewage drainpipe and a 4" sewage disposal site inlet. In the preferred embodiment, the ring may be threaded to facilitate a threaded fit between the sewage drainpipe and a threaded 4½" sewage disposal site inlet so that the adapter may form a substantially leak-free connection.

DETAILED DESCRIPTION OF THE PREFERRED EMBODIMENT AND OPERATION OF THE INVENTION

Figure 1:
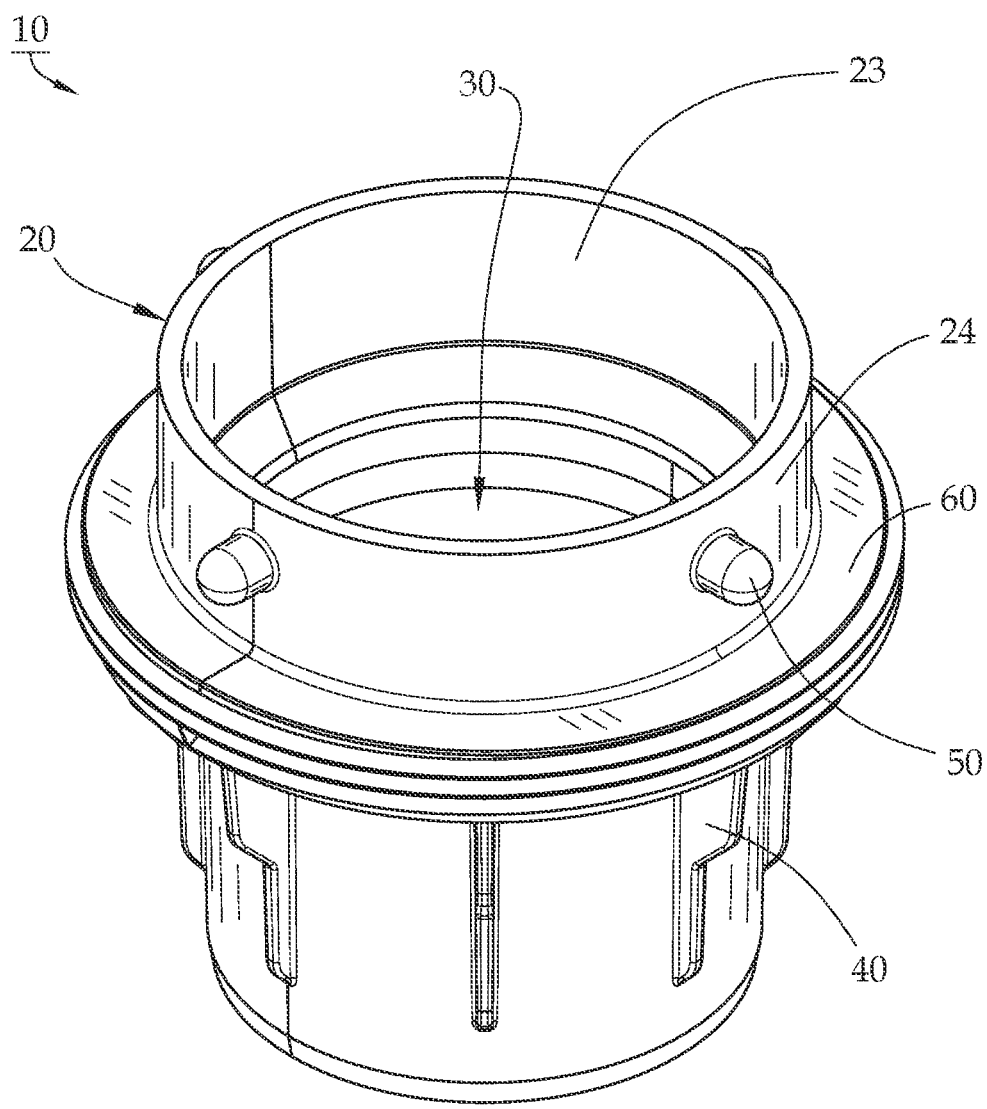
FIG. 1 shows a perspective view of an embodiment of the adapter of the present disclosure.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

For a better understanding of the disclosure and its operation, turning now to the drawings, FIGS. 1-8 illustrate a preferred embodiment of a drain adapter of the present disclosure for facilitating the connection between a sewage drainpipe (not shown) of a recreational vehicle and an inlet of a sewage disposal site (not shown). It should be noted that the adapter may also be used to facilitate the connection to a sewage disposal site inlet in other situations, such as boating, camping, and the like. The drain adapter, depicted as adapter 10, is preferably constructed as a unitary body including a tubular member 20, a ring 60, one or more flanges 40, and one or more connection lugs 50. In other embodiments, the adapter 10 is constructed as a non-unitary body including the tubular member 20, the ring 60, one or more flanges 40, and one or more connection lugs 50, it being understood that one or more such components may be removable.

Figure 4:
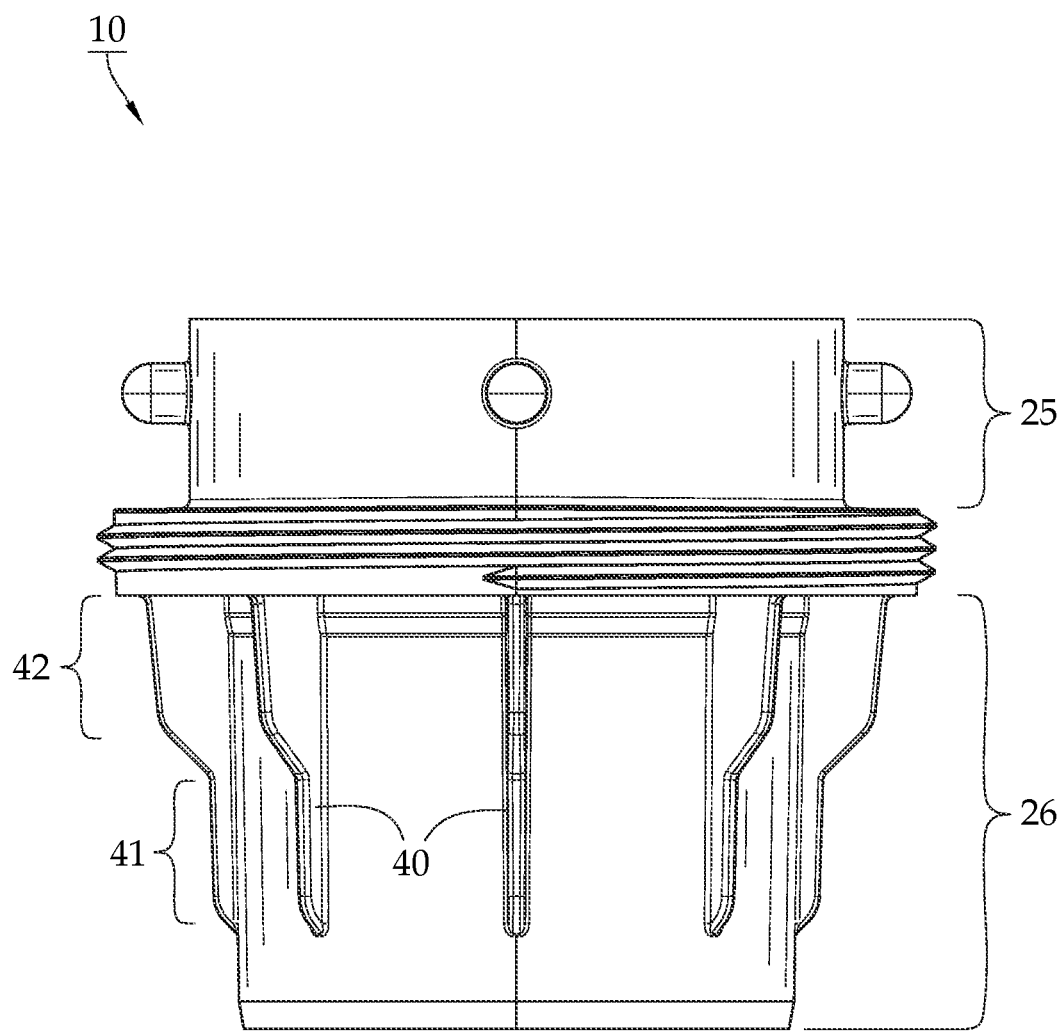
FIG. 4 demonstrates a front elevational view of an embodiment of the adapter of the present disclosure.
Figure 5:
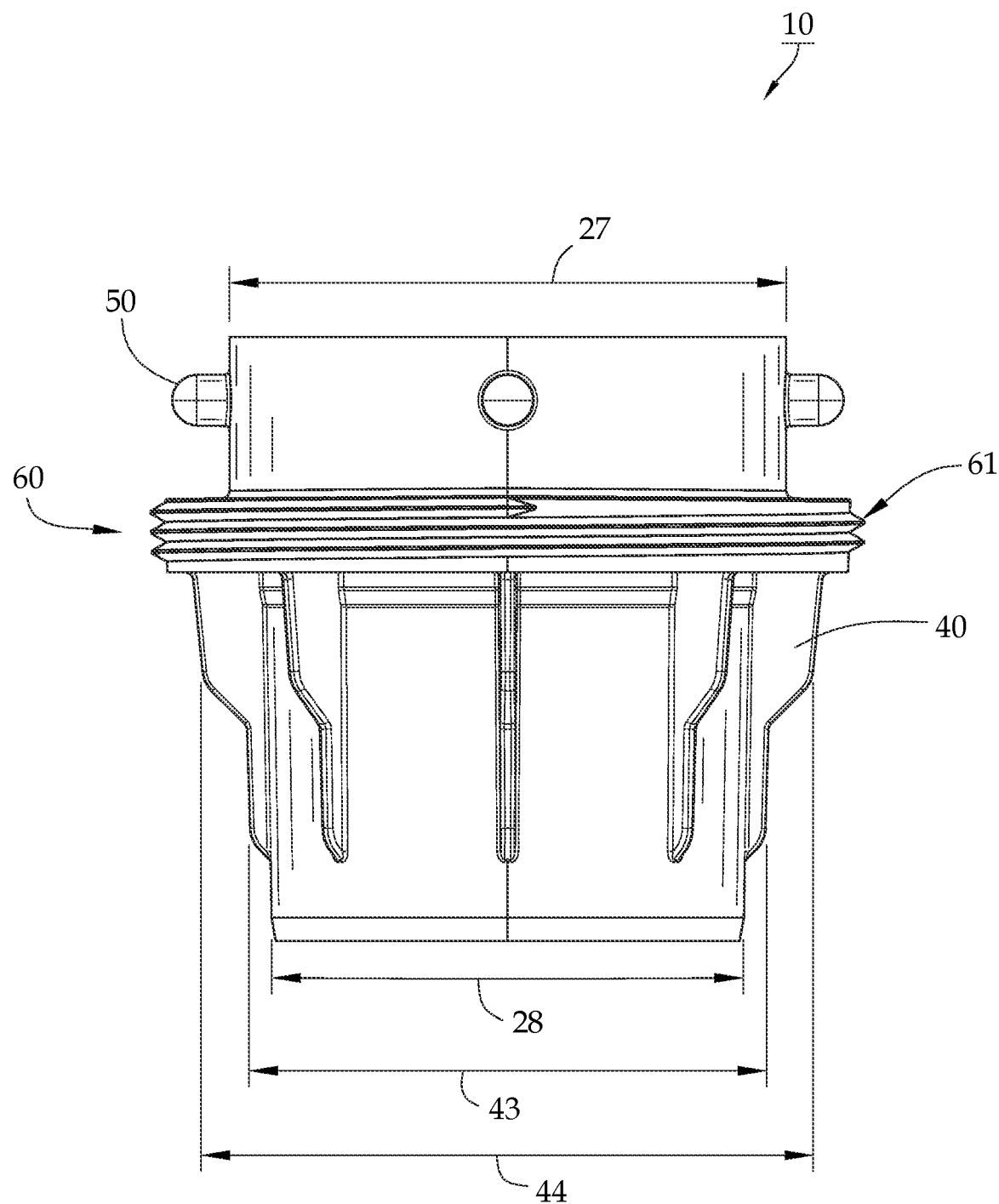
FIG. 5 illustrates a back elevational view of an embodiment of the adapter of the present disclosure.

FIG. 1 illustrates a perspective view of the adapter of the present disclosure. The preferred adapter 10 is formed of a tubular member 20 defining an inlet 21 (FIG. 2), an outlet 22 (FIG. 3), an inner surface 23, and an outer surface 24. The ring 60 disposed on the outer surface 24 segments the tubular member 20 into a top section 25 and a bottom section 26 as seen in FIG. 4, defining a top circumference 27 and a bottom circumference 28, respectively as seen in FIG. 5. During use, the bottom section 26 of the adapter 10 is preferably inserted into the sewage disposal site inlet (not shown) such that the top section 25 extends above the sewage disposal site inlet allowing a sewage drainpipe of a RV to quickly connect to the top section 25 of the adapter 10, and therefore to the sewage disposal site inlet. The top circumference 27 of the tubular member 20 is preferably greater than the bottom circumference 28 of the tubular member 20, but in alternate embodiments the top circumference 27 of the tubular member 20 may be the same or less than the bottom circumference 28 of the tubular member. In the preferred embodiment the top circumference 27 defines a diameter of approximately 3.5 inches (+/−0.25 inches) and the bottom circumference 28 defines a diameter of approximately 3.0 inches (+/−0.25 inches).

Figure 6:
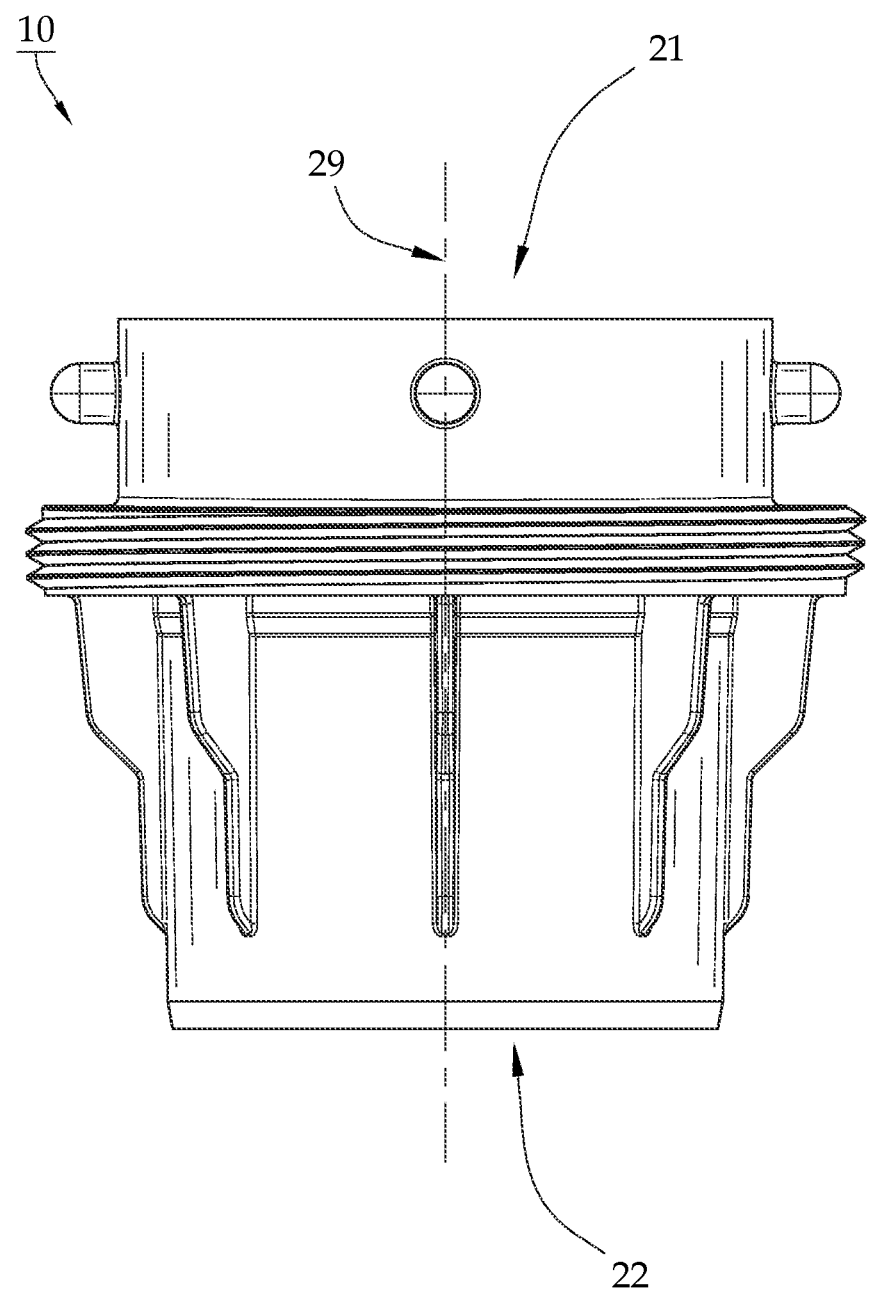
FIG. 6 features a right-side elevational view of an embodiment of the adapter of the present disclosure.

At least one flange 40 may extend from the outer surface 24 of the tubular member 20 to increase either the top circumference 27 or the bottom circumference 28 of the tubular member 20, preferably the bottom circumference 28 of the tubular member 20, so that the adapter 10 may accommodate sewage disposal site inlets of varying sizes. In one embodiment as seen in FIGS. 4 and 5, the flange 40 defines two portions, a lower portion 41 further defining a first extended dimension 43 and an upper portion 42 further defining a second extended dimension 44, lending to the flanges extending (i.e., increasing) the bottom circumference 28 of the tubular member 20 and defining a stepped configuration. As used herein, the term "extended" dimension typically refers to the dimension in reference to the bottom circumference 28. In one or more other embodiments, the flange 40 may be configured with more than two portions defining more than two different extended dimensions, typically relative to the bottom circumference 28 of the tubular member 20. The flanges 40 preferably extend from the outer surface 24 of the tubular member 20 to form a straight flange, i.e., extending vertically along a longitudinal axis 29 of the tubular member as seen in FIG. 6; however, in alternative embodiments the flanges 40 may extend from the outer surface 24 of the tubular member 20 to form a helix flange (i.e., wrapped around the outer surface 24 of the tubular member 20). The flanges 40 preferably extend perpendicularly from the outer surface 24 of the tubular member 20 but may extend from the outer surface 24 of the tubular member 20 at an angle (not shown). In the preferred embodiment, the first extended dimension 43 defines a circumference having a diameter of approximately 3.28 inches (+/−0.25 inches) and the second extended dimension 44 defines a circumference having a diameter of approximately 3.96 inches (+/−0.25 inches).

Figure 2:
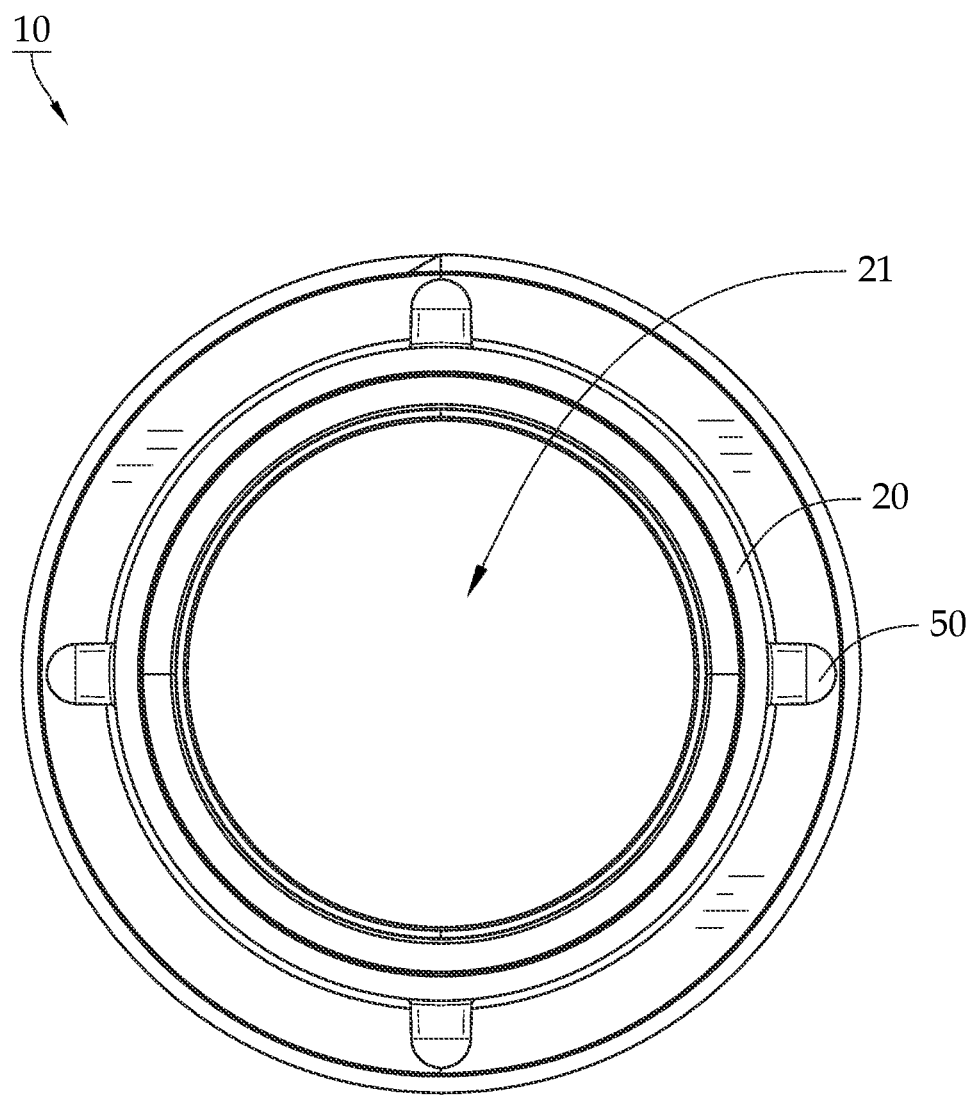
FIG. 2 pictures a top plan view of an embodiment of the adapter of the present disclosure.

FIG. 2 shows a top plan view of the adapter 10 of the present disclosure. At least one connection lug 50 extends from and is disposed on the outer surface 24 of the tubular member 20 to allow a female bayonet coupling to quickly connect to the adapter 10. The connection lug 50 may be disposed on the outer surface 24 of the tubular member 20 above the ring 60 (i.e., on the top section 25 of the tubular member 20). In the preferred embodiment a plurality (four are illustrated in the Figures) of connection lugs 50 are evenly spaced and dispersed at a predetermined orientation around the top section 25 of the outer surface 24 of the tubular member 20. The connection lugs 50 are configured, i.e., sized, shaped, and otherwise capable of quickly coupling with a female bayonet adapter (not shown) of the sewage drainpipe. FIG. 2 also demonstrates the inlet 21 of a channel 30 formed by the inner surface 23 of the tubular member 20. In the preferred embodiment, the inlet 21 of the channel 30 defines diameter of approximately 3.24 inches (+/−0.25 inches).

Figure 3:
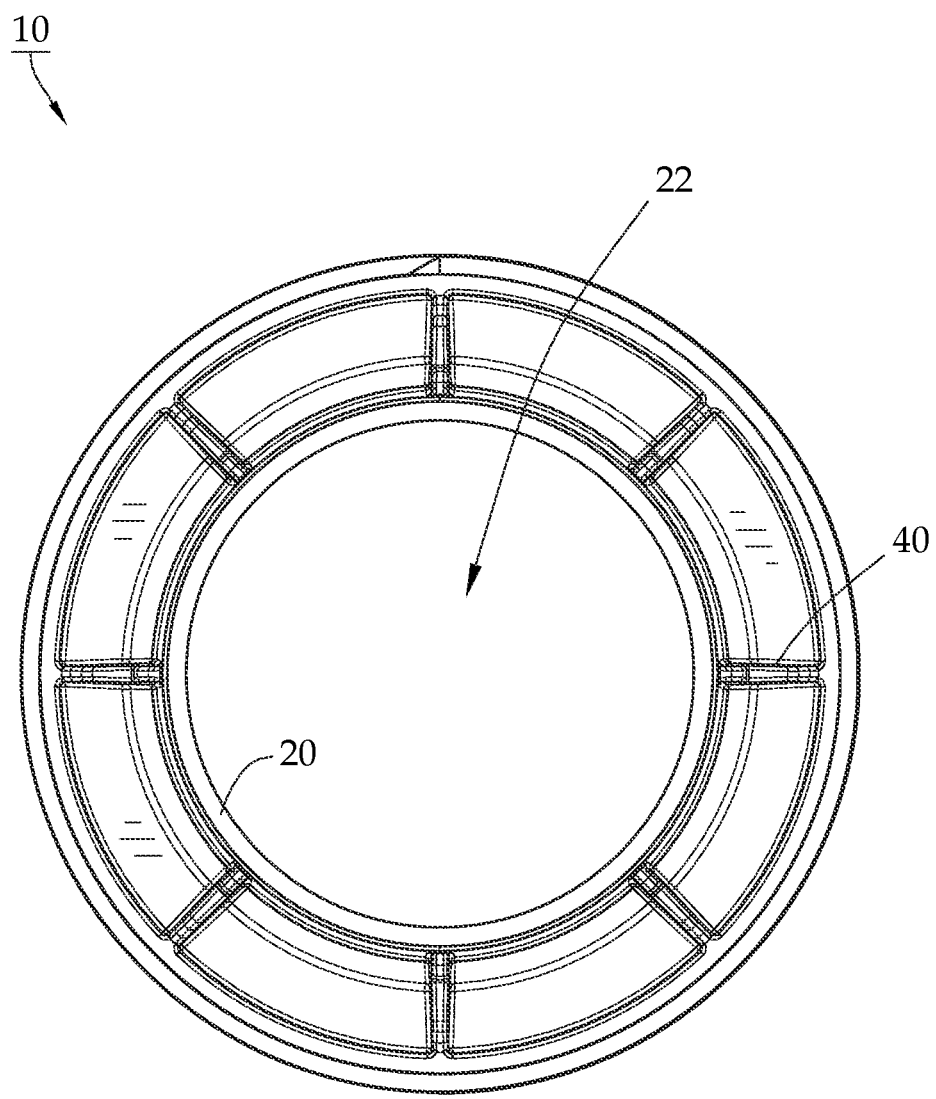
FIG. 3 depicts a bottom plan view of an embodiment of the adapter of the present disclosure.

FIG. 3 illustrates a bottom plan view of the adapter 10 of the present disclosure showing a plurality (eight are illustrated in the Figures) of flanges 40 that may be evenly spaced and dispersed at a predetermined orientation around the bottom section 26 of the outer surface 24 of the tubular member 20. Flanges 40 that are oriented vertically (i.e., along the longitudinal axis 29 of the tubular member 20) and spaced apart advantageously reduce the total amount of material required in manufacturing to extend (i.e., increase) the bottom circumference 28 of the tubular member 20. FIG. 3 demonstrates the outlet 22 of the channel 30 formed by the inner surface 23 of the tubular member 20. In the preferred embodiment, the outlet 22 of the channel 30 defines a diameter of approximately 2.75 inches (+/−0.25 inches).

FIGS. 4-7 demonstrate the front, back, right-side, and left-side views, respectively, of the preferred embodiment of adapter 10 of the present disclosure showing the connection lugs 50, the ring 60, and the flanges 40 extending from the outer surface 24 of the tubular member 20. The ring 60 may extend from and is annularly disposed around the tubular member 20. The ring 60 preferably defines a ring diameter 62 as seen in FIG. 8, which may be the widest portion of the adapter 10 and segments the tubular member 10 into the top section 25 and the bottom section 26. The lug connections 50 are ideally dispersed around the outer surface 24 of the top section 25 (i.e., above the ring 60) to facilitate a connection between the top section 25 of the tubular member 20 with a female bayonet adapter of the sewage drainpipe (not shown). The ring 60 preferably includes a threaded portion 61 formed on the ring 60 to enable a threaded connection with a sewage disposal site inlet that includes female threads. It shall be understood that the threaded portion 61 of the ring 60 may be a male thread or a female thread, but because in most instances sewage disposal site inlets include female threads, the ring 60 preferably includes a male threaded portion. It shall also be understood that the threaded portion 61 may define any of the recognized thread standards used in the industry. For example, the threaded portion may define a national pipe taper thread standard (NPT) so that the tapered nature of the threaded portion establishes a tight, leak-proof seal without any need for a thread sealant. In other embodiments, the threaded portion may define a national pipe straight standard (NPS) thread so that a thread sealant may be necessary for establishing a tight, leak-proof seal. In the preferred embodiment, the ring 60 is situated approximately 1.0 inch (+/−0.50 inches) below the inlet 21 of the tubular member 20 and the ring 60 extends from the outer surface 24 of the top section 25 of the tubular member 20 to define a diameter of approximately 4.5 inches (+/−0.50 inches).

As best shown in FIGS. 4-7, one or more of flanges 40 preferably define a smooth surface, however, in alternate embodiments the surface of the flanges 40 may include a threaded portion to facilitate a threaded connection with a sewage disposal site inlet that includes threads. In the preferred embodiment, the smooth (i.e., non-threaded) surface of the flanges 40 enables the adapter 10 to be quickly press fit into a sewage disposal site inlet, whether or not the sewage disposal site inlet is threaded, establishing a tight, frictional (i.e., interference) fit. A tight interference fit is a quicker and easier connection compared to a threaded fit, which requires a user to twist the threads of the adapter onto the sewage disposal site inlet. A threaded connection is more likely to form a substantially leak-free connection with the sewage disposal site inlet to safeguard against the contents disposed through the sewage drainpipe from spilling out, whether it be unsanitary waste, noxious fumes, and/or drainpipe cleaning chemicals. The adapter 10 is preferably configured i.e., sized, shaped, and otherwise capable of securing to sewage disposal sites having three-and-a-half-inch, four inch, and four-and-a-half-inch diameter sewage disposal site inlets.

Figure 7:
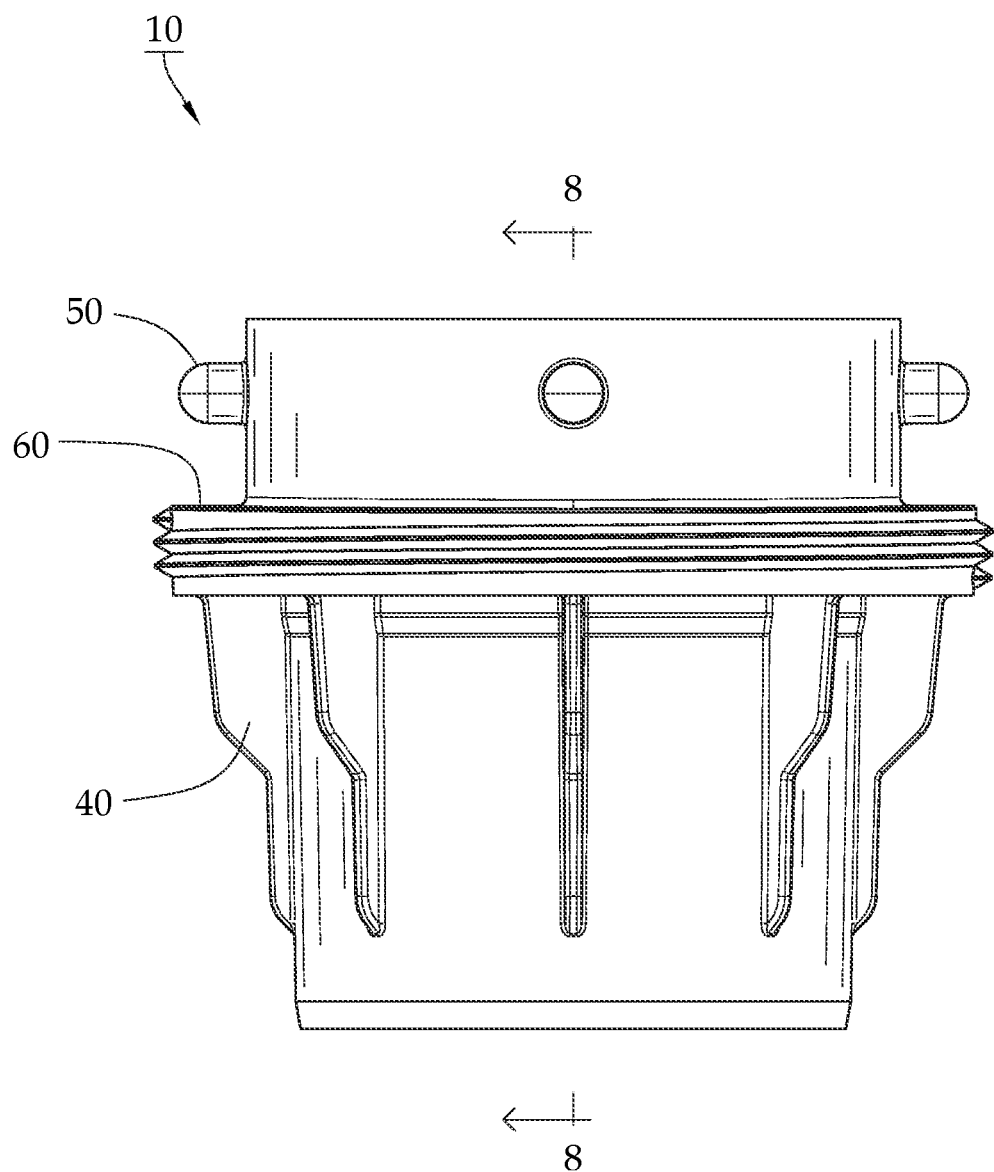
FIG. 7 shows a left-side elevational view of an embodiment of the adapter of the present disclosure.
Figure 8:
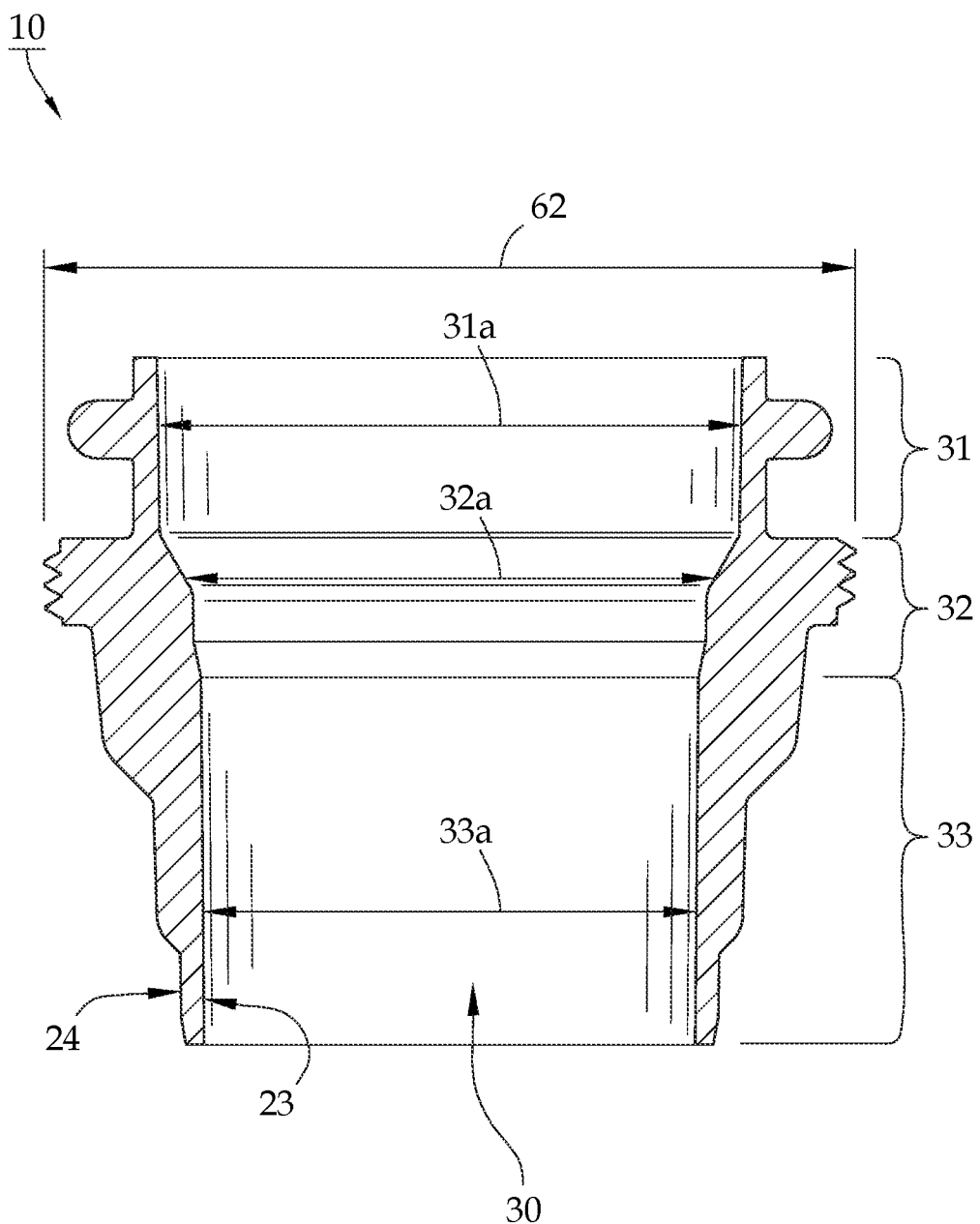
FIG. 8 illustrates a cross-sectional view of an embodiment of the adapter of the present disclosure, as seen along lines and arrows 8-8 in FIG. 7.

FIG. 8 shows a sectional view taken along lines 8-8 in FIG. 7 demonstrating the preferred embodiment of channel 30 formed by the inner surface 23 of the tubular member 20. The inner surface 23 of the tubular member 20 may define the channel 30 between the inlet 21 and the outlet 22 of the adapter 10. The channel 30 is preferably through the tubular member 20 such that the inlet 21 (i.e., open top end) and the outlet 22 (i.e., open bottom end) are in fluid communication. In the preferred embodiment, the inner surface 23 defines three sections of the channel 30: a top channel portion 31, a middle channel portion 32, and a bottom channel portion 33. The top channel portion 31 may define a top channel diameter 31a, which is substantially equal to the diameter of the inlet 21. The middle channel portion 32 may define a middle channel diameter 32a, which may be narrower than the top channel diameter 31a. The bottom channel portion 33 may define a bottom channel diameter 33a, which may be substantially equal to the diameter of the outlet 22.

The adapter 10 disclosed herein may be formed of a substantially rigid material, such as plastic, metal, or other similar composite materials selected so that the adapter 10 may retain the geometry after multiple uses with various sewage disposal site inlet.

The illustrations and examples provided herein are for explanatory purposes and are not intended to limit the scope of the appended claims.

We claim:

1. An adapter (10) comprising:
a tubular member (20) defining an inlet (21), an outlet (22), an inner surface (23), and an outer surface (24);
a flange (40) extending from and disposed on the outer surface (24); and
a ring (60) extending from and annularly disposed on the outer surface (24), the ring including a threaded portion (61) configured to thread onto a threaded sewer pipe inlet, and defining at least one connection lug (50) extending from and disposed on the outer surface (24) and above the ring (60);
wherein the adapter (10) is configured for insertion into a sewage disposal site inlet to enable a sewage drainpipe to couple to the sewage disposal site inlet via a connection between a bayonet fitting and the at least one connection lug (50).

2. The adapter (10) of claim 1, wherein the flange (40) is vertically oriented along a longitudinal axis (29) defined by the tubular member (20).

3. The adapter (10) of claim 1, wherein the flange (40) extends from the outer surface (24) to define a lower portion (41) defining a first extended dimension (43) and an upper portion (42) defining a second extended dimension (44), wherein the first extended dimension (43) and the second extended dimension (44) increase a bottom circumference (28) of the tubular member (20), and wherein the first extended dimension (43) is different than the second extended dimension (44).

4. The adapter (10) of claim 3, wherein the second extended dimension (44) is greater than the first extended dimension (43).

5. The adapter (10) of claim 3, wherein the lower portion (41) is configured to frictionally engage a 3½" sewer pipe inlet when a bottom section (26) of the tubular member (20) is inserted into the 3½" sewer pipe inlet.

6. The adapter (10) of claim 3, wherein the upper portion (42) is configured to frictionally engage a 4" sewer pipe inlet when a bottom section (26) of the tubular member (20) is inserted into the 4" sewer pipe inlet.

7. The adapter (10) of claim 1, wherein the ring (60) is configured to frictionally engage a 4½" sewer pipe inlet when a bottom section (26) of the tubular member (20) is inserted into the 4½" sewer pipe inlet.

8. The adapter (10) of claim 1, wherein the ring (60) includes a threaded portion (61) configured for threading onto a threaded 4½" sewer pipe inlet when a bottom section (26) of the tubular member (20) is inserted into the 4½" sewer pipe inlet.

9. The adapter (10) of claim 1 wherein the inner surface (23) defines a channel (30) with a top channel portion (31) further defining a top channel diameter (31a), a middle channel portion (32) further defining a middle channel diameter (32a), and a bottom channel portion (33) further defining a bottom channel diameter (33a).

10. The adapter (10) of claim 9 wherein the top channel diameter (31a) is larger than the middle channel diameter (32a) and the middle channel diameter (32a) is larger than the bottom channel diameter (33a).

11. The adapter (10) of claim 9 wherein the top channel diameter (31a) is substantially equal to a diameter of the inlet (21) and the bottom channel diameter (33a) is substantially equal to a diameter of the outlet (22).

12. An adapter (10) for coupling a sewage drainpipe to a sewage disposal site inlet, the adapter (10) comprising:
a tubular member (20) defining an inlet (21), an outlet (22), an inner surface (23), and an outer surface (24);
a plurality of flanges (40) vertically oriented extending from and disposed around the outer surface (24); and
a ring (60) extending from and annularly disposed around the outer surface (24) and above the plurality of flanges (40), the ring including a threaded portion (61) configured to thread onto a threaded sewer pipe inlet, and defining at least one connection lug (50) extending from and disposed on the outer surface (24) and above the ring (60);
wherein the adapter (10) is configured for insertion into a sewage disposal site inlet to enable a sewage drainpipe to couple to the sewage disposal site inlet via a connection between a bayonet fitting and the at least one connection lug (50).

13. The adapter (10) of claim 12 wherein each of the plurality of the flanges (40) are vertically oriented along a longitudinal axis (29) of the tubular member (20) and extend from the outer surface (24) to define a lower portion (41) defining a first extended dimension (43) and an upper portion (42) defining a second extended dimension (44), wherein the first extended dimension (43) is different than the second extended dimension (44).

14. The adapter (10) of claim 13, wherein the lower portion (41) is configured to frictionally engage a 3½" sewer pipe inlet when a bottom section (26) of the tubular member (20) is inserted into the 3½" sewer pipe inlet.

15. The adapter (10) of claim 13, wherein the upper portion (42) is configured to frictionally engage a 4" sewer pipe inlet when a bottom section (26) of the tubular member (20) is inserted into the 4" sewer pipe inlet.

16. The adapter (10) of claim 12, wherein the threaded portion (61) of the ring (60) is configured to thread onto a 4½" sewer pipe inlet when a bottom section (26) of the tubular member (20) is inserted into the 4½" sewer pipe inlet.

17. The adapter (10) of claim 12 wherein the inner surface (23) forms a channel (30) with a top channel portion (31) further defining a top channel diameter (31a), a middle channel portion (32) further defining a middle channel diameter (32a), and a bottom channel portion (33) further defining a bottom channel diameter (33a), wherein the top channel diameter (31a) is larger than the middle channel diameter (32a) and the middle channel diameter (32a) is larger than the bottom channel diameter (33a).

18. The adapter (10) of claim 17 wherein the top channel diameter (31a) is substantially equal to a diameter of the inlet (21) and the bottom channel diameter (33*a*) is substantially equal to a diameter of the outlet (22).

\* \* \* \* \*